US 8,359,475 B2

(12) United States Patent
Griffin (10) Patent No.: US 8,359,475 B2
(45) Date of Patent: Jan. 22, 2013

(54) SYSTEM, METHOD AND PROGRAM PRODUCT FOR GENERATING A CANCELABLE BIOMETRIC REFERENCE TEMPLATE ON DEMAND

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/370,379

(22) Filed: Feb. 12, 2009

(65) Prior Publication Data

US 2010/0205658 A1    Aug. 12, 2010

(51) Int. Cl.
G06F 21/00 (2006.01)
(52) U.S. Cl. ........................................ 713/186
(58) Field of Classification Search ............. 713/186
See application file for complete search history.

(56) References Cited

U.S. PATENT DOCUMENTS

| | | | |
|---|---|---|---|
| 5,467,081 A | 11/1995 | Drews et al. | |
| 5,649,099 A | 7/1997 | Theimer et al. | |
| 6,044,224 A | 3/2000 | Radia et al. | |
| 6,256,737 B1 | 7/2001 | Bianco et al. | |
| 6,554,188 B1 | 4/2003 | Johnson et al. | |
| 6,836,554 B1 | 12/2004 | Bolle et al. | |
| 7,030,760 B1 | 4/2006 | Brown | |
| 7,062,654 B2 | 6/2006 | Millen et al. | |
| 7,120,607 B2 | 10/2006 | Bolle et al. | |
| 7,298,243 B2 | 11/2007 | Juels et al. | |
| 7,302,583 B2 | 11/2007 | Forrest | |
| 7,310,734 B2 | 12/2007 | Boate et al. | |
| 7,627,895 B2 | 12/2009 | Gifford et al. | |
| 7,671,746 B2 | 3/2010 | Cortina et al. | |
| 7,739,744 B2 | 6/2010 | Burch et al. | |
| 7,788,500 B2 * | 8/2010 | Okamura et al. | 713/186 |
| 7,936,905 B2 * | 5/2011 | Takahashi et al. | 382/115 |
| 8,001,387 B2 | 8/2011 | Lee et al. | |
| 8,086,867 B2 | 12/2011 | Freeman et al. | |
| 8,242,892 B2 | 8/2012 | Griffin | |
| 2002/0026582 A1 | 2/2002 | Futamura et al. | |

(Continued)

FOREIGN PATENT DOCUMENTS

WO    WO 00/65770    11/2000

OTHER PUBLICATIONS

Griffin, P., ISO 19092: A Standard for Biometric Security Management, ISSA Journal, Jan. 2007, pp. 20-23.

(Continued)

Primary Examiner — Kambiz Zand
Assistant Examiner — Teshome Hailu
(74) Attorney, Agent, or Firm — Schmeiser, Olsen & Watts; Anna Linne (57) ABSTRACT

A system, method and program product for generating a cancelable biometric reference template on demand. The method includes creating, using a biometric application, a base reference template having a unique biometric template identifier that uniquely identifies biometric data corresponding to a biometric sample collected for an individual and generating, utilizing a transformation engine, a cancelable reference template derived from the base reference template, where the cancelable reference template generated is used by the individual to participate in a new biometric application without having to provide a new biometric sample or without having to rely on a biometric service provider to issue a new reference template for the new biometric application. The method further includes injecting the base reference template created into a secure portable device issued to the individual and loading the transformation engine onto the device for generating on demand the cancelable reference template.

24 Claims, 7 Drawing Sheets

U.S. PATENT DOCUMENTS

| | | |
|---|---|---|
| 2002/0100803 A1 | 8/2002 | Sehr |
| 2002/0174010 A1 | 11/2002 | Rice |
| 2003/0088782 A1 | 5/2003 | Forrest |
| 2003/0093666 A1 | 5/2003 | Millen et al. |
| 2003/0097383 A1 | 5/2003 | Smirnov et al. |
| 2003/0115490 A1 | 6/2003 | Russo et al. |
| 2003/0126433 A1 | 7/2003 | Hui |
| 2003/0129965 A1 | 7/2003 | Siegel |
| 2003/0189094 A1 | 10/2003 | Trabitz |
| 2004/0019570 A1* | 1/2004 | Bolle et al. ............... 705/64 |
| 2004/0020984 A1* | 2/2004 | Clark ........................ 235/382 |
| 2004/0123114 A1 | 6/2004 | McGowan |
| 2004/0162984 A1 | 8/2004 | Freeman et al. |
| 2004/0193893 A1* | 9/2004 | Braithwaite et al. ......... 713/186 |
| 2005/0005136 A1 | 1/2005 | Chen et al. |
| 2005/0038718 A1 | 2/2005 | Barnes et al. |
| 2005/0055582 A1 | 3/2005 | Bazakos et al. |
| 2005/0088320 A1 | 4/2005 | Kovach |
| 2005/0180619 A1 | 8/2005 | McClurg et al. |
| 2005/0198508 A1 | 9/2005 | Beck |
| 2005/0229007 A1* | 10/2005 | Bolle et al. .................. 713/186 |
| 2005/0240778 A1* | 10/2005 | Saito ........................... 713/186 |
| 2005/0283614 A1 | 12/2005 | Hardt |
| 2006/0078171 A1 | 4/2006 | Govindaraju et al. |
| 2006/0090079 A1 | 4/2006 | Oh et al. |
| 2006/0104484 A1 | 5/2006 | Bolle et al. |
| 2006/0158751 A1 | 7/2006 | McClurg et al. |
| 2006/0200683 A1 | 9/2006 | King |
| 2006/0206723 A1* | 9/2006 | Gil et al. .................... 713/186 |
| 2006/0267773 A1 | 11/2006 | Roque |
| 2006/0289648 A1 | 12/2006 | Shafer |
| 2007/0040654 A1 | 2/2007 | Lee et al. |
| 2007/0040693 A1 | 2/2007 | Medve et al. |
| 2007/0044139 A1 | 2/2007 | Tuyls et al. |
| 2007/0119924 A1 | 5/2007 | Register, Jr. et al. |
| 2007/0136581 A1 | 6/2007 | Hoghaug et al. |
| 2007/0164863 A1 | 7/2007 | Himberger et al. |
| 2007/0180261 A1 | 8/2007 | Akkermans et al. |
| 2007/0226512 A1 | 9/2007 | Kevenaar et al. |
| 2007/0243932 A1 | 10/2007 | Rothschild et al. |
| 2008/0024271 A1 | 1/2008 | Oberman et al. |
| 2008/0037833 A1 | 2/2008 | Takahashi et al. |
| 2008/0065895 A1 | 3/2008 | Liu et al. |
| 2008/0072284 A1 | 3/2008 | Horvitz et al. |
| 2008/0130882 A1 | 6/2008 | Hagglund et al. |
| 2008/0157927 A1 | 7/2008 | Soppera et al. |
| 2008/0162943 A1 | 7/2008 | Ali et al. |
| 2008/0169909 A1 | 7/2008 | Park et al. |
| 2009/0022374 A1 | 1/2009 | Boult |
| 2009/0027207 A1 | 1/2009 | Shelton et al. |
| 2009/0271635 A1 | 10/2009 | Liu et al. |
| 2010/0201489 A1 | 8/2010 | Griffin |
| 2010/0201498 A1 | 8/2010 | Griffin |
| 2010/0205431 A1 | 8/2010 | Griffin |
| 2010/0205452 A1 | 8/2010 | Griffin |
| 2010/0205660 A1 | 8/2010 | Griffin |
| 2010/0332838 A1 | 12/2010 | Zhu et al. |

OTHER PUBLICATIONS

Griffin, P., U.S. Appl. No. 12/370,345, System, Method and Program Product for Associating a Biometric Reference Template With a Radio Frequency Identification Tag, filed on Feb. 12, 2009.

Griffin, P., U.S. Appl. No. 12/370,359, System, Method and Program Product for Communicating a Privacy Policy Associated With a Biometric Reference Template, filed on Feb. 12, 2009.

Griffin, P., U.S. Appl. No. 12/370,365, System, Method and Program Product for Communicating a Privacy Policy Associated With a Radio Frequency Identification Tag and Associated Object, filed on Feb. 12, 2009.

Griffin, P., U.S. Appl. No. 12/370,350, System, Method and Program Product for Recording Creation of a Cancelable Biometric Reference Template in a Biometric Event Journal Record, filed on Feb. 12, 2009.

Griffin, P., U.S. Appl. No. 12/370,334, System, Method and Program Product for Checking Revocation Status of a Biometric Reference Template, filed on Feb. 12, 2009.

Ratha, N. K. et al, Generating Cancelable Fingerprint Templates, IEEE Transactions on Pattern Analysis and Machine Intelligence, vol. 29, No. 4, Apr. 2007.

Berners-Lee, T. et al., Uniform Resource Identifiers (URI): Generic Syntax, RFC 2396, http://ietfreport.isoc.org/rfc/rfc2396.txt, Aug. 1998, pp. 1-40.

ITU-T Telecommunication Standardization Sector of ITU, X.667, Series X: Data Networks and Open System Communications—OSI networking and system aspects—Naming, Addressing and Registration, ISO/IEC 9834-8: 2005 (E), 34 pages, Geneva, Switzerland 2005.

ITU-T Telecommunication Standardization Sector of ITU, X.667, Series X: Data Networks and Open System Communications—OSI networking and system aspects—Abstract Syntax Notation One (ASN.1), ISO/IEC 8824-1:2003 (E), 146 pages, Geneva, Switzerland 2005.

Molnar, et al.; Privacy for RFID Through Trusted Computing; WPES '05; Nov. 7, 2005; Alexandria, Virginia; pp. 31-34.

Juels, et al.; Soft Blocking: Flexible Blocker Tags on the Cheap; WPES '04; Oct. 28, 2004; Washington, D.C.; pp. 1-7.

Office Action (Mail Date Nov. 9, 2011) for Patent Application No. 12/370,359, filed Feb. 12, 2009; Confirmation No. 5560.

Amendment filed Feb. 9, 2012 in response to Office Action (Mail Date Nov. 9, 2011) for U.S. Appl. No. 12/370,359, filed Feb. 12, 2009; Confirmation No. 5560.

Office Action (Mail Date Nov. 17, 2011) for U.S. Appl. No. 12/370,365, filed Feb. 12, 2009; Confirmation No. 5569.

Amendment filed Feb. 9, 2012 in response to Office Action (Mail Date Nov. 17, 2011) for U.S. Appl. No. 12/370,365, filed Feb. 12, 2009; Confirmation No. 5569.

Office Action (Mail Date Nov. 1, 2011) for U.S. Appl. No. 12/370,345, filed Feb. 12, 2009; Confirmation No. 4437.

Amendment filed Jan. 30, 2012 in response to Office Action (Mail Date Nov. 1, 2011) for U.S. Appl. No. 12/370,345, filed Feb. 12, 2009; Confirmation No. 4437.

Office Action (Mail Date Jul. 13, 2011) for U.S. Appl. No. 12/370,334, filed Feb. 12, 2009; Confirmation No. 5517.

Amendment filed Sep. 22, 2011 in response to Office Action (Mail Date Jul. 13, 2011) for U.S. Appl. No. 12/370,334, filed Feb. 12, 2009; Confirmation No. 5517.

Final Office Action (Mail Date Oct. 12, 2011) for U.S. Appl. No. 12/370,334, filed Feb. 12, 2009; Confirmation No. 5517.

Amendment and Request for Continued Examination filed Jan. 11, 2012 in response to Final Office Action (Mail Date Oct. 12, 2011) for U.S. Appl. No. 12/370,334, filed Feb. 12, 2009; Confirmation No. 5517.

Notice of Allowance (Mail Date Mar. 30, 2012) for U.S. Appl. No. 12/370,365, filed Feb. 12, 2009; Confirmation No. 5569.

Office Action (Mail Date Mar. 13, 2012) for U.S. Appl. No. 12/370,350, filed Feb. 12, 2009; Confirmation No. 5548.

Final Office Action (Mail Date Mar. 9, 2012) for U.S. Appl. No. 12/370,345, filed Feb. 12, 2009; Confirmation No. 5537.

Notice of Allowance (Mail Date Jul. 26, 2012 for U.S. Appl. No. 12/370,334, filed Feb. 12, 2009; Confirmation No. 5517.

Notice of Allowance (Mail Date Jun. 21, 2012) for U.S. Appl. No. 12/370,359, filed Feb. 12, 2009; Confirmation No. 5560.

Amendment filed Jun. 12, 2012 in response to Office Action (Mail Date Mar. 13, 2012) for U.S. Appl. No. 12/370,350, filed Feb. 12, 2009; Confirmation No. 5548.

Final Office Action (Mail Date Jul. 13, 2012) for U.S. Appl. No. 12/370,350, filed Feb. 12, 2009; Confirmation No. 5548.

Amendment filed May 8, 2012 in response to Final Office Action (Mail Date Mar. 9, 2012) for U.S. Appl. No. 12/370,345, filed Feb. 12, 2009; Confirmation No. 5537.

Advisory Action (Mail Date May 14, 2012) for U.S. Appl. No. 12/370,345, filed Feb. 12, 2009; Confirmation No. 5537.

Response filed May 24, 2012 filed in response to Advisory Action (Mail Date May 14, 2012) for U.S. Appl. No. 12/370,345, filed Feb. 12, 2009; Confirmation No. 5537.

Notice of Allowance (Mail Date May 30, 2012) for U.S. Appl. No. 12/370,345, filed Feb. 12, 2009; Confirmation No. 5537.

Office Action (Mail Date Mar. 6, 2012) for U.S. Appl. No. 12/370,334, filed Feb. 12, 2009; Confirmation No. 5517.

Amendment After Final filed Sep. 12, 2012 in response to Final Office Action (Mail Date Jul. 13, 2012) for U.S. Appl. No. 12/370,350, filed Feb. 12, 2009; Confirmation No. 5548.

U.S. Appl. No. 13/611,000, filed Sep. 12, 2012; Confirmation No. 8823.

* cited by examiner

SYSTEM, METHOD AND PROGRAM PRODUCT FOR GENERATING A CANCELABLE BIOMETRIC REFERENCE TEMPLATE ON DEMAND

FIELD OF THE INVENTION

The present invention relates to computer systems and software, and more specifically to a technique for generating a cancelable or revocable or derivative biometric reference template on demand, that is, upon the request of a user or individual using a personal cancelable biometric reference template generation device, and allowing an individual to become a member of a computer system without the cost and inconvenience of undergoing a biometric enrollment process.

BACKGROUND OF THE INVENTION

Biometric reference templates can be uniquely identified and associated with the identity of an individual. The biometric data component of a template is a constant that identifies an individual. Exposure of a reference template over time, when aggregated with other information, provides a footprint of activities that the individual participated in (such as, making a purchase in a store, clocking in and out of work, paying a highway toll) and the locations of that individual at various points in time (such as, when they were at a particular banking machine, toll booth, or store's check-out register). As such, there is a need to protect the privacy of individuals who wish to benefit from the use of biometrics, but who have concerns about (or the need for) personal privacy, or who do not wish to be easily monitored and tracked.

SUMMARY OF THE INVENTION

The present invention resides in a system, method and program product for generating a cancelable or revocable or derivative biometric reference template on demand, using a personal cancelable biometric reference template generation device, in accordance with an embodiment of the invention. In an aspect, the invention provides a method for generating on demand a cancelable biometric reference template. The method includes creating, using a biometric application, a base biometric reference template having a unique biometric template identifier assigned thereto that uniquely identifies biometric data corresponding to a biometric sample collected for an individual and generating, utilizing a cancelable biometric transformation engine, a cancelable biometric reference template derived from the base biometric reference template, where the cancelable biometric reference template generated is used by the individual to participate in a new biometric application without having to provide a new biometric sample or without having to rely on a biometric service provider to issue a new biometric reference template for the new biometric application. The method further includes injecting the base biometric reference template created into a secure portable device issued to the individual and loading the cancelable biometric transformation engine onto the secure portable device for generating on demand of the individual the cancelable biometric reference template derived from the base biometric reference template for the new biometric application. In an embodiment, the injecting step further includes signing the base biometric reference template created before injecting the base biometric reference template into the secure portable device. In an embodiment, the injecting step further includes encrypting the biometric data contained in the base biometric reference template before injecting the base biometric reference template into the secure portable device. In an embodiment, the generating step further includes requesting input of one or more authentication factors for generating the cancelable biometric reference template for the individual. The method further includes storing the base biometric reference template and the cancelable biometric reference template in a database.

In another aspect, the invention provides a system for generating on demand a cancelable biometric reference template. The system includes a biometric application for creating a base biometric reference template from biometric data collected for an individual, the base biometric reference template created having a unique biometric template identifier assigned thereto that uniquely identifies the biometric data collected for the individual, a cancelable biometric transformation engine for generating one or more cancelable biometric reference templates from the base biometric reference template, a secure portable device assigned to the individual for storing the one or more cancelable biometric reference templates generated, where the individual dispenses a cancelable biometric reference template of the one or more cancelable biometric reference templates generated as needed to participate in a new biometric application without having to provide a new biometric sample or without having to rely on a biometric service provider to issue a new biometric reference template. In an embodiment, the system further includes an authentication tool for authenticating identity of the individual seeking to generate a cancelable biometric reference template. In an embodiment, the system further includes a database for storing the base biometric reference template and the one or more cancelable biometric reference templates. In an embodiment, the base biometric reference template is injected into the secure portable device and in an embodiment the cancelable biometric transformation engine is loaded onto the secure portable device for generating the cancelable biometric reference template on demand. In an embodiment, the biometric application assigns a respective identifier to a respective cancelable biometric reference template of the one or more cancelable biometric reference templates generated for uniquely identifying the respective cancelable biometric reference template. In an embodiment, the base biometric reference template and the one or more cancelable biometric reference templates are signed before being stored. In an embodiment, the biometric application tracks an identity of an intended recipient receiving the respective cancelable biometric reference template for the new biometric application.

In another aspect, the invention provides a computer program product for generating on demand a cancelable biometric reference template. The computer program product includes a computer readable storage medium, first program instructions to create, using a biometric application, a base biometric reference template having a unique biometric template identifier assigned thereto that uniquely identifies biometric data corresponding to a biometric sample collected for an individual, second program instructions to generate, utilizing a cancelable biometric transformation engine, a cancelable biometric reference template derived from the base biometric reference template and a central processing unit for executing each of the first and second program instructions, where the cancelable biometric reference template generated is used by the individual to participate in a new biometric application without having to provide a new biometric sample or without having to rely on a biometric service provider to issue a new biometric reference template for the new biometric application. In an embodiment, the computer program product further includes third program instructions to store the base biometric reference template and the cancelable biometric reference template in a database. In an embodiment, the second program instructions further include instructions to inject the base biometric reference template created into a secure portable device issued to the individual and to load the cancelable biometric transformation engine onto the secure portable device for generating on demand of the individual the cancelable biometric reference template derived from the base biometric reference template for the new biometric application. In an embodiment, the second program instructions further include instructions to sign the base biometric reference template created before injecting the base biometric reference template into the secure portable device. In an embodiment, the second program instructions further include instructions to encrypt the biometric data contained in the base biometric reference template before injecting the base biometric reference template into the secure portable device. In an embodiment, the second program instructions include instructions to request input of one or more authentication factors for generating the cancelable biometric reference template for the individual. In an embodiment, each of the first, second and third program instructions are recorded on the computer readable storage medium.

Further, in yet another aspect, the invention provides a process for deploying computing infrastructure includes integrating computer-readable code into a computing system, where the code in combination with the computing system is capable of performing a process for generating on demand a cancelable biometric reference template. The process includes creating, using a biometric application, a base biometric reference template having a unique biometric template identifier assigned thereto that uniquely identifies biometric data corresponding to a biometric sample collected for an individual and generating, utilizing a cancelable biometric transformation engine, a cancelable biometric reference template derived from the base biometric reference template, where the cancelable biometric reference template generated is used by the individual to participate in a new biometric application without having to provide a new biometric sample or without having to rely on a biometric service provider to issue a new biometric reference template for the new biometric application. The process further includes injecting the base biometric reference template created into the secure portable device issued to the individual and loading the cancelable biometric transformation engine onto the secure portable device for generating on demand of the individual a cancelable biometric reference template derived from the base biometric reference template for a new biometric application. In an embodiment, the injecting step further includes signing the base biometric reference template created before injecting the base biometric reference template into the secure portable device. In an embodiment, the injecting step further includes encrypting the biometric data contained in the base biometric reference template before injecting the base biometric reference template into the secure portable device. In an embodiment, the generating step further includes requesting input of one or more authentication factors for generating the cancelable biometric reference template for the individual.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
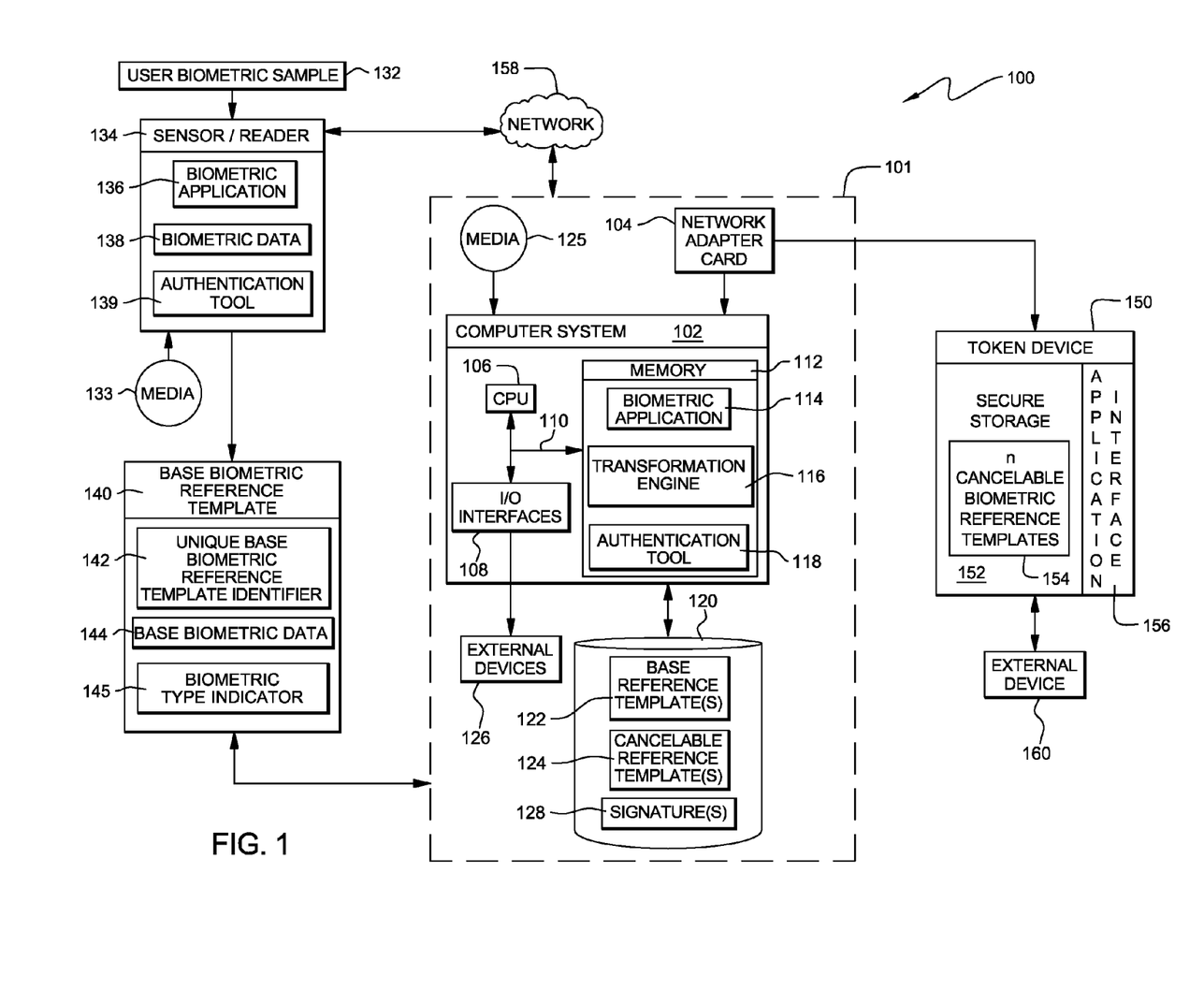
FIG. 1 is a block diagram depicting an embodiment of a computer infrastructure having a cancelable biometric reference template generation engine or tool deployed thereon for creating and injecting one or more cancelable or revocable or derivative biometric reference templates onto a token device, in response to a request from a user or individual, in accordance with an embodiment of the present invention.

In one embodiment, the invention provides a computer infrastructure having a cancelable biometric reference template transformation or generation engine deployed thereon for creating and injecting one or more cancelable or revocable or derivative biometric reference templates onto a token device, in response to a request from a user or individual, in accordance with an embodiment of the present invention. The computer infrastructure 100 includes a computer system 102 for generating one or more cancelable or revocable biometric reference templates using a transformation engine or tool 116 deployed thereon, in accordance with an embodiment of the invention. In an embodiment, as depicted in FIG. 1, computer system or server 102 is intended to represent any type of computer system that is maintained in a secure environment, that is, for which access control is enforced (as represented by the dotted lines indicated by reference numeral 101). Referring to FIG. 1, the computer system or server 102 is shown to include a CPU (Central CPU) 106, a memory 112, a bus 110, and input/output (I/O) interfaces 108. Further, the server 102 is shown in communication with external I/O devices/resources 126 and database 120. In general, CPU 106 executes computer program code stored in memory 112, such as the biometric application 114 for processing biometric data contained in a biometric sample 132. Further, the memory 112 has a cancelable biometric transformation engine 116 (also referred to herein simply as "transformation engine" or "cancelable biometric transformation engine") for generating one or more cancelable or revocable biometric reference templates (referred to herein as "cancelable reference templates" or "revocable reference templates") from a base biometric reference template (also referred to herein as simply "biometric reference template" or "reference template" or "base template" or "base reference template"), as explained further herein below. In an embodiment, the cancelable biometric reference templates 124 generated by the system using the transformation engine 116 are stored in database 120 within the infrastructure 101. In an embodiment, each respective cancelable biometric reference template 124 contains the transformation of the base biometric data 144 into respective cancelable biometric data, as explained further herein below. In addition, the memory 112 has stored thereon an authentication tool 118 for authenticating signatures associated with a base biometric reference template. In an embodiment, a base biometric reference template 140 is created using an individual's biometric sample 132. In an embodiment, the base biometric reference template 140 is stored with other base biometric reference templates 122 within a database 120 within the computer infrastructure 101. In particular, as shown in FIG. 1, a user or individual provides a biometric sample 132 using a biometric sensor or a biometric reader or scanning device 134 coupled to the computer infrastructure 101 via network 158. In an embodiment, the biometric sensor or reader or scanner 134 converts the scanned user biometric sample 132 to a digital form using an instance 136 of the biometric application 114 deployed on the computer system 102. In an embodiment, an instance 136 of the biometric application 114 deployed on the computer system 102 is loaded into the sensor or reader device 134 within the computer infrastructure 100 from a computer readable storage medium or media (reference numeral 133), such as, a magnetic tape or disk, optical media, DVD, memory stick, semiconductor memory, etc. or downloaded from the server via a network adapter card (reference numerals 104) installed on the computer system or server 102. In particular, the instance 136 of the biometric application 114 loaded into the biometric sensor or reader device 134 is used to process the biometric sample 132 collected from a person or an individual or user into base biometric data 138, which, in an embodiment, is stored within the biometric sensor or reader device 134. Further, the base biometric data 138 processed by the sensor or reader device 134 is used to create a base biometric reference template 140. Further, the sensor or reader device 134 uses an instance 139 of the authentication tool or program 118 for signing a biometric reference template that is created. Further, the authentication tool 139 is used to sign any attributes that are associated with and/or included in a base biometric reference template 140. In an embodiment, the base biometric reference template 140 created is assigned a unique base biometric reference template identifier 142 (also referred to herein simply as "reference template identifier") for uniquely identifying the base biometric reference template 140 created using a person's biometric data 138 that is processed from the person's biometric sample 132. In an embodiment, the unique reference template identifier 142 is created in the form of an information object identifier (OID) as defined in ISO/IEC 8824-1 and ISO/IEC 9834-8, a universally unique identifier (UUID) as defined in ISO/IEC 9834-8, or a uniform resource identifier (URI) as defined in RFC 2396. Further, in an embodiment, the base biometric data 138 (also referred to herein simply as "biometric data") that is processed using a biometric sample 132 provided by an individual is associated with the base biometric reference template 140 and is included in the base biometric reference template 140 itself, shown as base biometric data 144. In an embodiment, the base biometric data 144 stored within the base biometric reference template 140 is encrypted or protected in some manner, such as signing the entire base biometric reference template 140 containing the base biometric data 144, as discussed further herein below. In an embodiment, the base biometric reference template 140 includes a component "biometric type indicator" (reference numeral 145) that provides an indication of the type of biometric data used to create the base biometric reference template, for example, a fingerprint, iris or retinal scan, etc. In an embodiment, the base biometric reference template 140 that is created using a biometric sample 132 provided by a user is stored in a database 120 within the system 102 along with other base biometric reference templates (referred to as reference numeral 122). In an embodiment, each of the base biometric reference templates 122 stored within database 120 within the computer system 102 is encrypted to protect the identities of the individuals that the base biometric reference templates 122 belong to. Further, in an embodiment, each of the base biometric reference templates 122 is signed with a digital signature before being stored in database 120, and the digital signature(s) (reference numeral 128) are also stored in database 120. In an embodiment, a RSA digital signature scheme is used to sign the base biometric reference template, such that, the digital signature provides integrity protection over the entire base biometric reference template 140. As such, a digital signature can be used to detect if any of the base biometric reference template information has been tampered with. In particular, the act of digitally signing the entire base biometric reference template cryptographically binds every component within the base biometric reference template together. Further, if a biometric reference template contains any attributes, then such attributes are also cryptographically bound to the base biometric reference template. In an embodiment, to form a digital signature on an information object, such as, a biometric reference template, a cryptographic hash (also referred to herein as "encrypted hash" or "hash value" or simply "hash") is computed over the entire object or biometric reference template and then the hash is signed. For example, where a RSA digital signature scheme is used to sign a biometric reference template, a key is used to encrypt the hash to form the digital signature. Furthermore, in an embodiment, the signed biometric reference template is stored along with the digital signature in a database, for example, database 120. However, the signed biometric reference template and the digital signature may be stored separately within the computer system 100, as shown. Furthermore, the digital signature may be detached from the base biometric reference template (as shown) or may be appended to or associated with the base biometric reference template. The use of digital signatures to sign objects to be authenticated is well known in the art and, as such, will not be discussed further herein. It should be understood, however, that although not shown, other hardware and software components (e.g., additional computer systems, routers, firewalls, etc.) could be included in infrastructure 100. Further, in an embodiment, as shown in FIG. 1, a base biometric reference template 140 is used as input for the cancelable biometric transformation engine 116 within the computer system 100. In particular, a base biometric reference template 140 is inputted into the transformation engine 116 and the resulting output outputted by the transformation engine 116 is one or more cancelable biometric reference templates 124, which in an embodiment are stored as cancelable biometric reference templates 124 in database 120 and which are also injected as cancelable biometric reference templates 154 into a security token device 150, as explained herein below. In an embodiment, the transformation engine 116 comprises a data transformation function that uses a transformation algorithm to transform the base biometric data 144 in a base biometric reference template 140 into cancelable biometric data for creating one or more cancelable biometric reference templates 124. The transformation engine 116 varies the seed values (transformation keys) of the transformation function to generate one or more cancelable biometric reference templates from the base biometric data in a base biometric reference template. In an embodiment, the data transformation function of the transformation engine 116 includes a matrix of function key values (also referred to herein as "transform keys", "transformation keys" or "transform values" or "key values"), where a different set of transformation keys is used to create a different cancelable biometric reference template. The one or more cancelable biometric reference templates 124 generated using the transformation engine 116 are injected or stored into a security token device 150 (also referred to herein as "security token" or "token device"), which is issued to a person, or individual or device holder. As such, a device holder of the token device (namely, the individual or person matching the base biometric reference template 140 and the one or more cancelable biometric reference templates 154) can dispense the cancelable biometric reference templates 154, as needed. The security token device 150 is a hardware device that is used to prove an individual or person's identity and serves as an authentication factor (for example, in the case of a customer trying to access their bank account). The token device 150 acts like an electronic key to access something, where the token device 150 is used in addition to or in place of a password to prove that the customer is who they claim to be by virtue of possession of the token device. In an embodiment, the unique base biometric reference template identifier 142 contained within the base biometric reference template 140 is used to identify the individual or token device holder. Further, in an embodiment, the token device 150 comprises a secure storage area 152 that securely stores the one or more cancelable biometric reference templates 154 generated by the transformation engine 116. Furthermore, in an embodiment, the token device 150 comprises an application interface 156 for interfacing with an external device 160, such as, a computer or a laptop, etc. The token device could be embedded in a laptop computer, a Personal Digital Assistant (PDA), a mobile telephone or other device, and the device could serve as a standalone security token, implemented as a smartcard, Universal Serial Bus (USB), or software. Similarly, the same base reference template of an individual and the cryptographic keys of the trusted party could be installed on multiple platforms, such as, the personal home computer, wireless device, PDA, and mobile telephone of the individual. Additionally, in an embodiment, the security token device is a cryptographically-capable device that securely stores the private key component of a public-private asymmetric key pair of a trusted party and the hardware, software, and data necessary to create and sign new biometric reference templates that are derivatives of the base reference template, and that contain cancelable biometric data.

Figure 2:
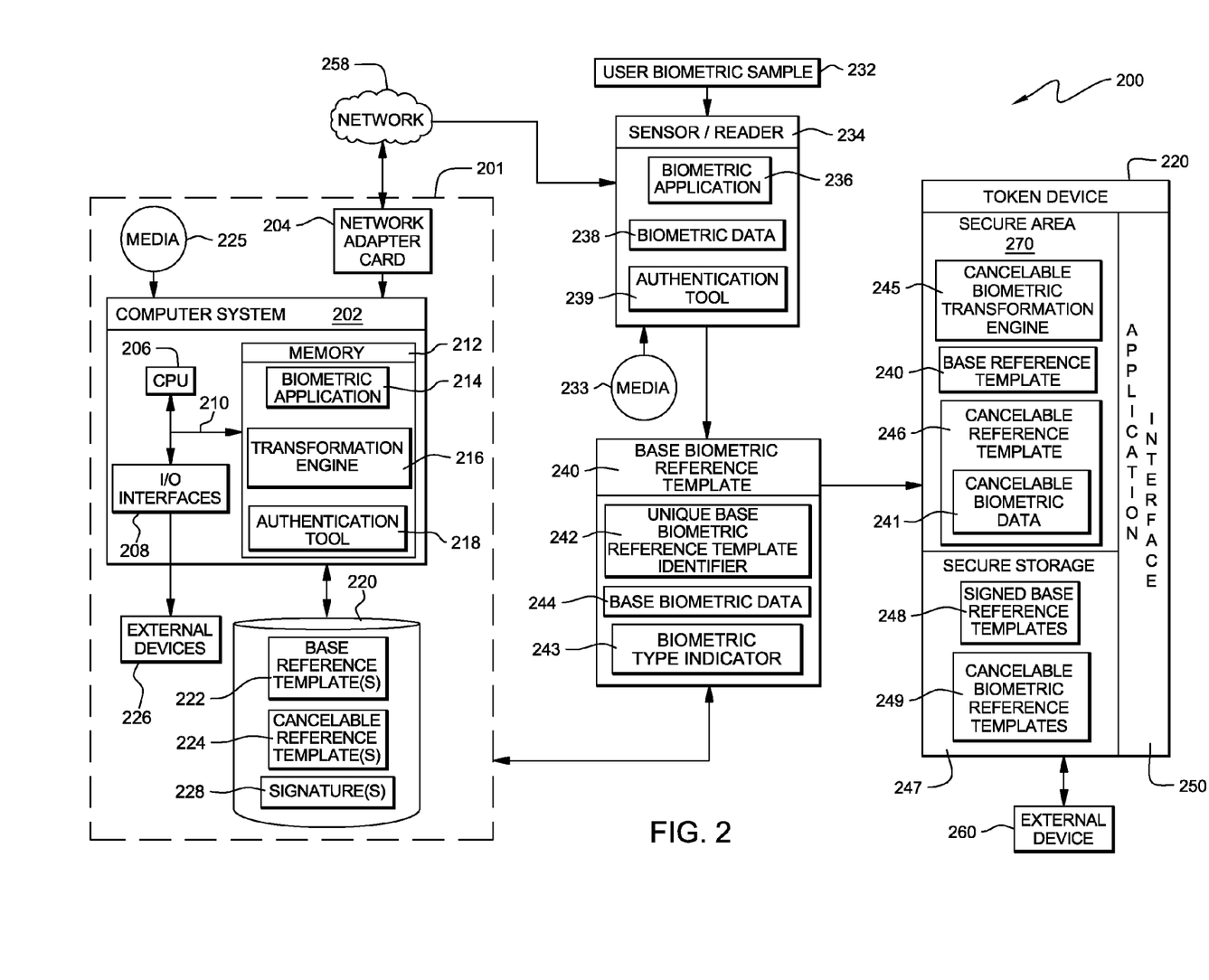
FIG. 2 is a block diagram depicting another embodiment of a computer system for generating a cancelable or revocable or derivative biometric reference template on demand using a cancelable biometric reference template generation tool or engine deployed onto a token device, in response to a request from a user or individual, in accordance with an embodiment of the present invention.

Reference is now made to FIG. 2, reference numeral 200, which is a block diagram depicting an embodiment of a computer infrastructure for generating a cancelable or revocable or derivative biometric reference template on demand using a cancelable biometric reference template transformation or generation engine deployed onto a token device, in response to a request from a user or individual, in accordance with an embodiment of the present invention. Turning to FIG. 2, computer infrastructure 200 includes a computer system 202 for generating one or more cancelable or revocable biometric reference templates using a transformation engine 216 deployed thereon, in accordance with an embodiment of the invention. In an embodiment, as depicted in FIG. 2, computer system or server 202 is intended to represent any type of computer system that is maintained in a secure environment, that is, for which access control is enforced (as represented by the dotted lines indicated by reference numeral 201). Referring to FIG. 2, the computer system or server 202 is shown to include a CPU (Central CPU) 206, a memory 212, a bus 210, and input/output (I/O) interfaces 208. Further, the server 202 is shown in communication with external I/O devices/resources 226 and database 220. In general, CPU 206 executes computer program code stored in memory 212, such as the biometric application 214 for processing biometric data contained in a biometric sample 232. Further, the memory 212 has a cancelable biometric transformation engine 216 (also referred to herein simply as "transformation engine" or "cancelable template generation tool") for generating one or more cancelable or revocable biometric reference templates from a base biometric reference template (also referred to herein as simply "biometric reference template" or "reference template" or "base template" or "base reference template"), as explained further herein below. In an embodiment, the cancelable biometric reference templates 224 generated by the system using the transformation engine 216 are stored in database 220 within the system 202. In addition, the memory 212 has stored thereon an authentication tool 218 for authenticating signatures associated with a base biometric reference template and for signing cancelable biometric reference templates. In an embodiment, a base biometric reference template 240 is created using an individual's biometric sample 232. In an embodiment, the base biometric reference template 240 is stored with other base biometric reference templates 222 within a database 220 within the secure environment 201. In particular, as shown in FIG. 2, a user or individual provides a biometric sample 232 using a biometric sensor or a biometric reader or scanning device 234 coupled to the computer infrastructure 201 via network 258. In an embodiment, the biometric sensor or reader or scanner 234 converts the scanned user biometric sample 232 to a digital form using an instance 236 of the biometric application 214 deployed on the computer system 202. In an embodiment, an instance 236 of the biometric application 214 deployed on the computer system 202 is loaded into the sensor or reader device 234 within the computer infrastructure 200 from a computer readable storage medium or media (reference numeral 233), such as, a magnetic tape or disk, optical media, DVD, memory stick, semiconductor memory, etc. or downloaded from the server via a network adapter card (reference numerals 204) installed on the computer system or server 202. In particular, the instance 236 of the biometric application 214 loaded into the biometric sensor or reader device 234 is used to process the biometric sample 232 collected from a person or an individual or user into base biometric data 238, which, in an embodiment, is stored within the biometric sensor or reader device 234. Further, the base biometric data 238 processed by the sensor or reader device 234 is used to create a base biometric reference template 240. Further, the sensor or reader device 234 uses an instance 239 of the authentication tool or program 218 for signing the biometric reference template that is created. Further, the authentication tool 239 is used to sign any attributes that are associated with and/or included in a base biometric reference template 240. In an embodiment, the base biometric reference template 240 created is assigned a unique base biometric reference template identifier 242 (also referred to herein simply as "reference template identifier") for uniquely identifying the base biometric reference template 240 created using a person's base biometric data 238 that is processed from the person's biometric sample 232. In an embodiment, the unique reference template identifier 242 is created in the form of an information object identifier (OID) as defined in ISO/IEC 8824-1 and ISO/IEC 9834-8, a universally unique identifier (UUID) as defined in ISO/IEC 9834-8, or a uniform resource identifier (URI) as defined in RFC 2396. Further, in an embodiment, the base biometric data 238 (also referred to herein simply as "biometric data") that is processed using a biometric sample 232 provided by an individual is associated with the base biometric reference template 240 and is included in the base biometric reference template 240 itself, shown as base biometric data 244. In an embodiment, the base biometric data 244 stored within the base biometric reference template 240 is encrypted or protected in some manner, such as signing the entire base biometric reference template 240 containing the base biometric data 244, as discussed further herein below. In an embodiment, the base biometric reference template 240 includes a component, "biometric type indicator" (reference numeral 243) that provides an indication of the type of base biometric data used to create the base biometric reference template, for example, a fingerprint, iris or retinal scan, etc. In an embodiment, the base biometric reference template 240 that is created using a biometric sample 232 provided by a user is stored in a database 220 within the system 202 along with other base biometric reference templates (referred to as reference numeral 222). In an embodiment, each of the base biometric data within each of the base biometric reference templates 222 stored within database 220 within the computer system 202 is encrypted to protect the identities of the individuals that the base biometric reference templates 222 belong to. Further, in an embodiment, each of the base biometric reference templates 222 is signed with a digital signature before being stored in the database 220, and the digital signature(s) (reference numeral 228) are also stored in database 220. In an embodiment, a RSA digital signature scheme is used to sign the base biometric reference template 240, such that, the digital signature provides integrity protection over the entire base biometric reference template 240. As such, a digital signature can be used to detect if any of the base biometric reference template information has been tampered with. In particular, the act of digitally signing the entire biometric reference template cryptographically binds every component within the base biometric reference template together. Further, if a biometric reference template contains any attributes, then such attributes are also cryptographically bound to the base biometric reference template. In an embodiment, to form a digital signature on an information object, such as, a biometric reference template, a cryptographic hash (also referred to herein as "encrypted hash" or "hash value" or simply "hash") is computed over the entire object or biometric reference template and then the hash is signed. For example, where a RSA digital signature scheme is used to sign a biometric reference template, a key is used to encrypt the hash to form the digital signature. Furthermore, in an embodiment, the signed biometric reference template is stored along with the digital signature in a database, for example, database 220. However, the signed biometric reference template and the digital signature may be stored separately within database 220 in computer system 202, as shown. Furthermore, the digital signature may be detached from the base biometric reference template (as shown) or may be attached or coupled to the base biometric reference template. The use of digital signatures to sign objects to be authenticated is well known in the art and, as such, will not be discussed further herein. It should be understood, however, that although not shown, other hardware and software components (e.g., additional computer systems, routers, firewalls, etc.) could be included in infrastructure 200. Further, as shown in FIG. 2, in an embodiment, a base biometric reference template 240 is injected into a security token device (also referred to herein as "security token" or "token device") 220 itself for generating an output of one or more cancelable or revocable or derivative biometric reference templates. The token device 220 is issued to the person or individual corresponding to the base biometric reference template 240, who is also referred to as the device holder. The security token device 220 is a hardware device that constitutes one authentication factor used to prove an individual or person's identity (for example, in the case of a customer trying to access their bank account). The token device 220 acts like an electronic key to access something, where the token device 220 is used in addition to or in place of a password to prove that the customer is who they claim to be by virtue of possession of the token device. In an embodiment, the injected base biometric reference template is stored in a secure storage area 270 of the token device 220 as base biometric reference template 240. Further, in an embodiment, the token device 220 has an instance 245 of the cancelable biometric transformation engine 216 (also referred to herein simply as "transformation engine"), which in an embodiment is loaded into the token device 220 itself for transforming the base biometric reference template 240 that is injected into the token device 220. In particular, the injected base biometric reference template 240 is inputted into the transformation engine 245 and the transformation engine 245 outputs a cancelable biometric reference template 246. In an embodiment, the transformation engine 245 comprises a data transformation function that uses a transformation algorithm to transform the base biometric data in a base biometric reference template 240 into one or more cancelable biometric reference template 246. In an embodiment, a data transformation function of the transformation engine 245 includes a matrix of function key values (also referred to herein as "transform keys", "transformation keys" or "transform values" or "key values"), where a different transformation key set is used to create a different cancelable biometric reference template, where a cancelable biometric reference template 246 contains the transformation of the base biometric data 244 into cancelable biometric data (reference numeral 241). In an embodiment, each cancelable biometric reference template 246 generated by the transformation engine 245 is stored with other cancelable biometric reference templates 249 within a secure storage 247 of the token device 220. As such, a device holder of the token device (namely, the individual or person matching the base biometric reference template 240) can generate a cancelable biometric reference template 246, as needed. In an embodiment, the unique base biometric reference template identifier 242 contained within the base biometric reference template 240 is used to identify the individual or token device holder. Furthermore, in an embodiment, the token device 220 comprises an application interface 250 for interfacing with an external device 260, such as, a computer or a laptop, etc. Additionally, in an embodiment, the security token device is a cryptographically-capable device that securely stores the private key component of a public-private asymmetric key pair of a trusted party and the hardware, software, and data necessary to create and sign new biometric reference templates that are derivatives of the base reference template and that contains cancelable biometric data. Additionally, in an embodiment, the data transformation function of the transformation engine is assigned a unique transform function identifier for identifying the data transformation function used to create a particular cancelable biometric reference template. Further, in an embodiment, the unique transform function identifier identifying a particular data transformation function and the particular transformation key used to create a particular cancelable biometric reference template are tracked in a list to ensure that the same transform keys are not used twice. In an embodiment, the cancelable biometric reference template that is created using transform keys of the data transformation function of the transformation engine is assigned a unique cancelable biometric reference template identifier for identifying the cancelable biometric reference template. Further, in an embodiment, each of the cancelable biometric reference templates 246 contains the unique base biometric reference template identifier 242 as an attribute of the respective cancelable biometric reference template, such that, a cancelable biometric reference template can be associated with the corresponding base biometric reference template. Furthermore, in an embodiment, each cancelable biometric reference template that is generated or created is assigned its own unique cancelable biometric reference template identifier that identifies the respective cancelable biometric reference template. In an embodiment, the newly created cancelable biometric reference template adheres to international standards for the format of biometric templates and, as such, the unique cancelable biometric reference template identifier comprises a universally unique identifier (UUID). In an embodiment, the token device 220 is pre-loaded with the public-private key pair (cryptographic keys) of a trusted party whose private key is used by the token device for the device holder or individual to sign derivative or cancelable biometric reference templates that contain cancelable biometric data, on an as-needed basis determined by the device holder or individual. The private key is not known to the device holder or individual. The private key is associated with a public key certificate that identifies the trusted party, who generates the key pair and places the keys onto the token device for use as their proxy, only in the context of the token device. The same keys may reside on more than one personal security token device, since they are not the cryptographic keys of the device holder, but are the keys of the trusted party who enables and distributes the device. Operational control of the token device can be enabled in a number of possible ways, such as by entry of a Personal Identification Number (PIN), a password or pass phrase, by matching a biometric sample against reference biometric information stored securely in the device, or by some combination of these to affect multifactor authentication using two or three factors (something the individual has—the device; something the individual knows—a PIN; and something the individual is—a match of the individual's biometric sample to some biometric reference data). The token device could be embedded in a laptop computer, a Personal Digital Assistant (PDA), a mobile telephone or other device, and it could serve as a standalone security token, implemented as a smartcard, Universal Serial Bus (USB), or software. And the same base reference template of an individual and the cryptographic keys of the trusted party could be installed on multiple platforms, such as the personal home computer, laptop, PDA, and mobile telephone of the individual.

Figure 3:
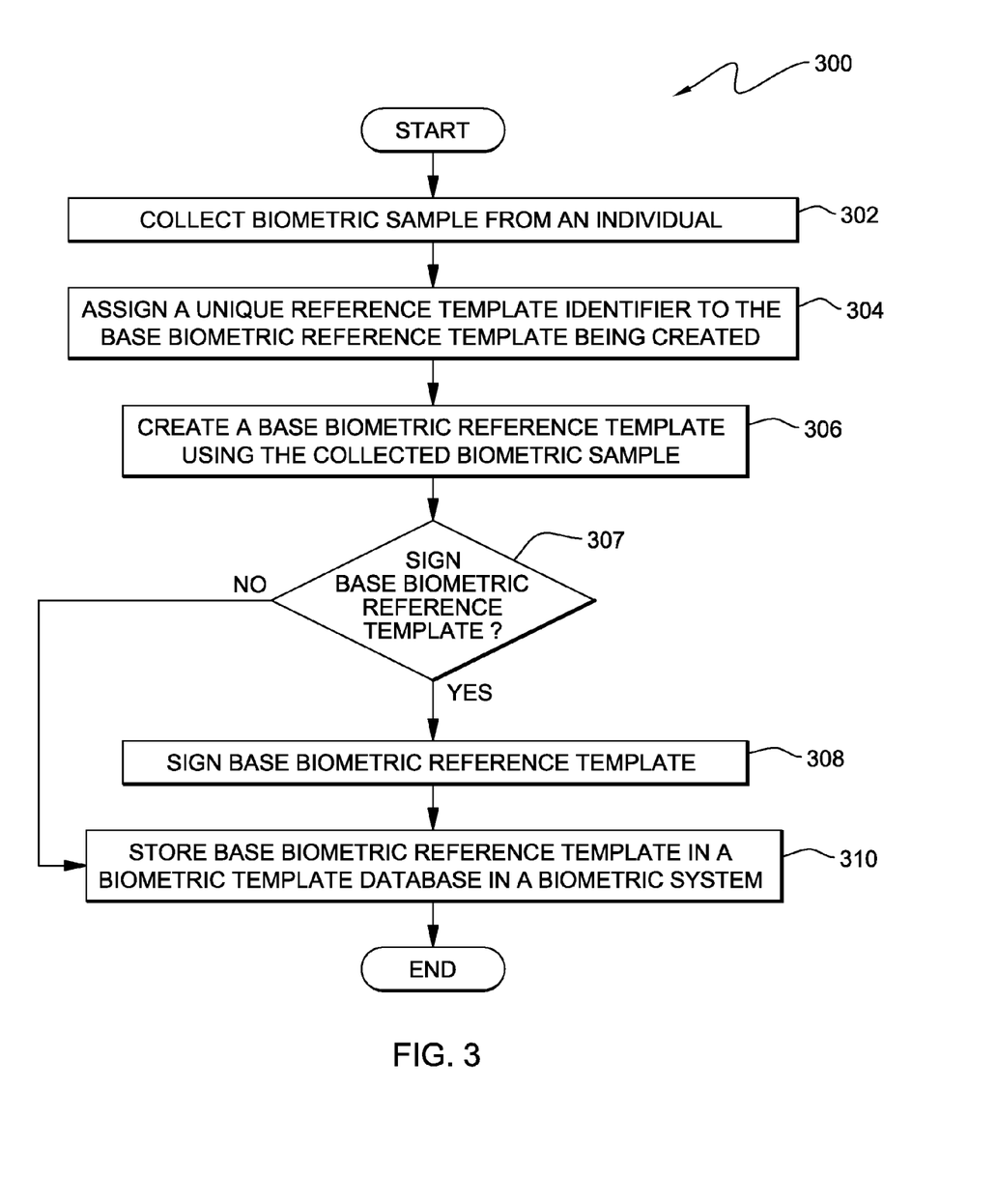
FIG. 3 depicts a flowchart outlining the steps for generating a base biometric reference template using a biometric sample collected from a user or individual, in accordance with an embodiment of the present invention.

In another embodiment, the invention provides a method for generating a cancelable or revocable biometric reference template on demand, that is, upon the request of a user or individual using a personal cancelable biometric reference template generation device, in accordance with an embodiment of the invention. Reference is now made to FIGS. 3 through 7, which together outline the steps for generating a cancelable biometric reference template on demand, that is, upon the request of a user or individual using a personal cancelable biometric reference template generation device. Turning to FIG. 3, reference numeral 300, depicts a flowchart outlining the steps for generating a base biometric reference template using a biometric sample collected from a user or individual in accordance with an embodiment of the invention. Referring to FIG. 3, the process begins with a biometric application within a biometric reader or scanner device collecting in step 302 a biometric sample from an individual to create a base biometric reference template within the computer system. In step 304, a unique biometric reference template identifier is assigned to the base biometric reference template being created and the base biometric reference template is created in step 306 using the biometric sample collected from the individual. In step 307, a determination is made by the biometric application as to whether or not to sign the base biometric reference template created. If the biometric application receives input indicating that the base biometric reference template is to be signed, then the base biometric reference template is signed in step 308 using a digital signature. The use of digital signatures to sign objects to be authenticated is well known in the art and, as such, will not be discussed herein. The signed biometric reference template is stored in a database within the computer system in step 310, ending the process. However, going back to step 307, if a determination is made that the base biometric reference template is not to be signed, then the base biometric reference template is stored in a database in step 310 within the computer system, ending the process.

Figure 4:
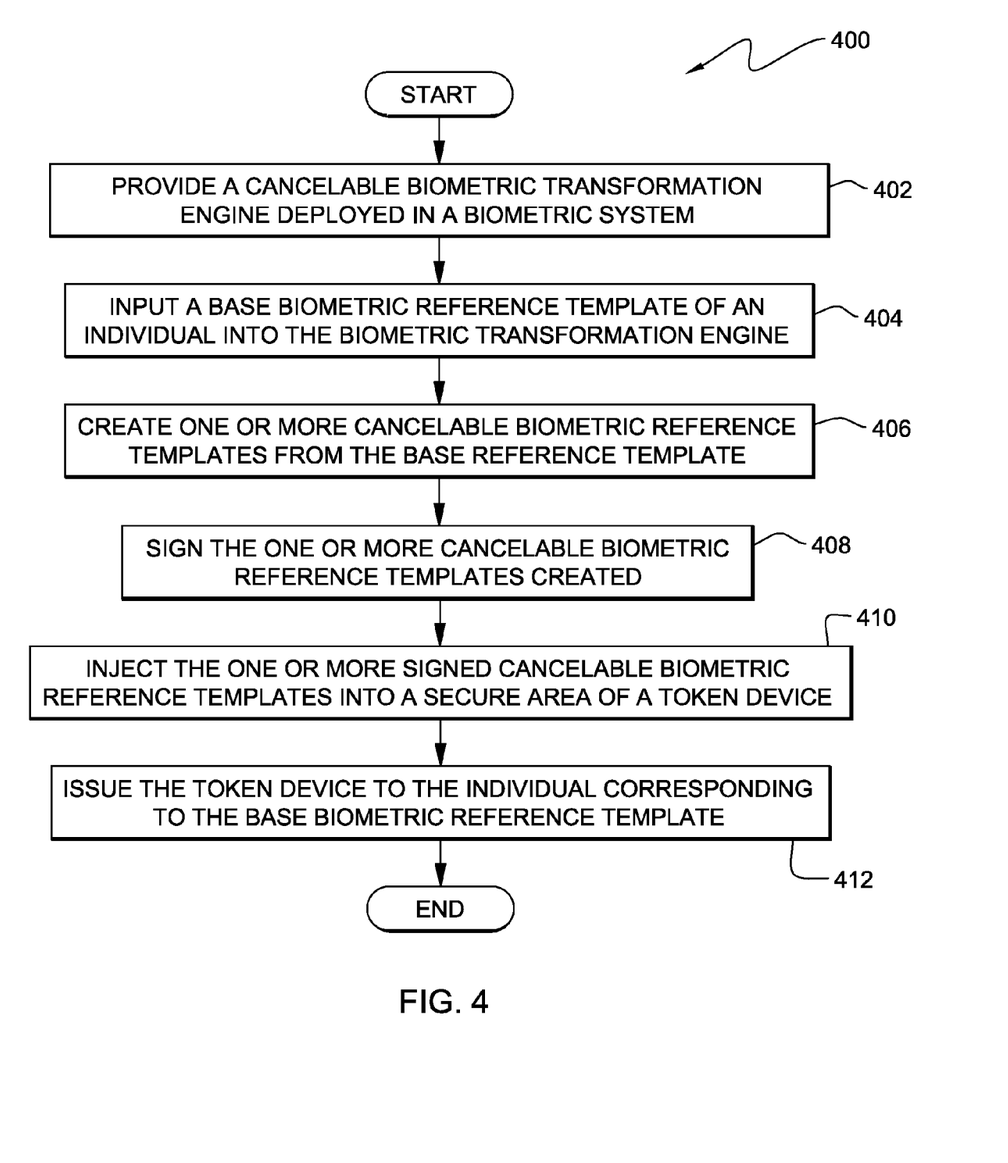
FIG. 4 depicts a flowchart outlining the steps for dispensing a cancelable or revocable or derivative biometric reference template on demand to a user or individual, in response to a request from the user or individual, using one embodiment of a personal cancelable biometric reference template generation device, in accordance with an embodiment of the present invention.

Turning to FIG. 4, reference numeral 400 depicts a flowchart outlining the steps for dispensing a cancelable or revocable or derivative biometric reference template on demand to a user or individual, in response to a request from the user or individual, using one embodiment of a personal cancelable biometric reference template generation device, in accordance with an embodiment of the present invention. Referring to FIG. 4, the process beings with a biometric service provider providing, in step 402, a cancelable biometric transformation engine that is deployed on a device, such as, a computer system within a computer system. In step 404, a base biometric reference template created using a biometric sample collected from an individual is inputted into the transformation engine. The transformation engine applies a transformation or transform function having a specific transform key value set to create a cancelable biometric reference template in step 406. Further, multiple cancelable biometric reference templates can be created in step 406 by varying the key values of the transform function in the transformation engine. In an embodiment, the one or more cancelable biometric reference templates created are signed in step 408 using digital signatures. Further, the one or more signed cancelable biometric reference templates are injected in step 410 into a security token device that is to be distributed to an individual or user whose base biometric reference template is used to create the cancelable biometric reference templates. In step 412, the security token device is issued to the individual or user (device holder), such that, the individual can dispense a cancelable biometric reference template from the one or more cancelable biometric reference templates stored onto the security token device to an entity, as needed, ending the process. The process of dispensing a cancelable biometric reference template is discussed further herein below with respect to FIG. 6.

Figure 5:
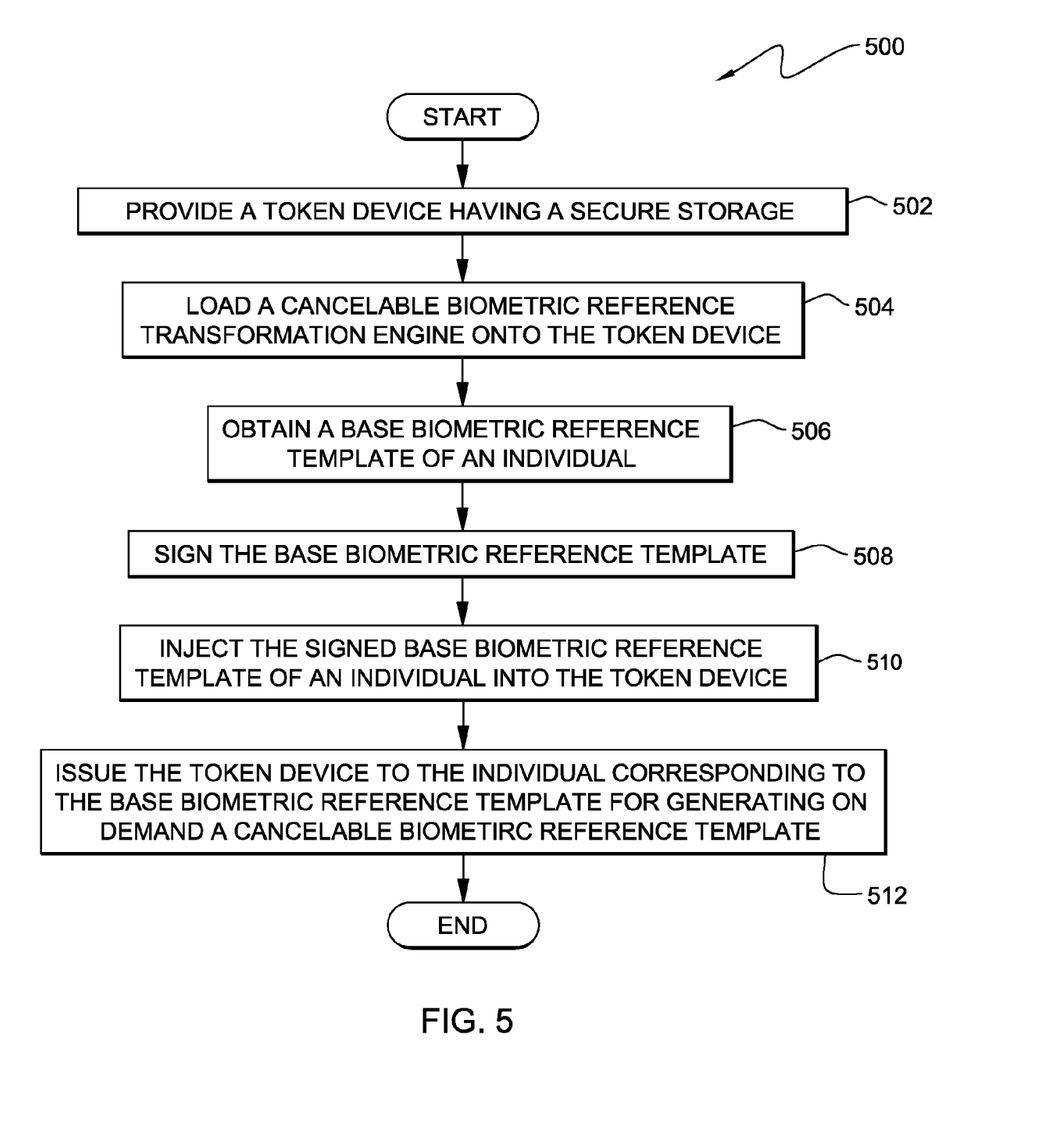
FIG. 5 depicts a flowchart outlining the steps for generating a cancelable or revocable or derivative biometric reference template on demand to a user or individual, in response to a request from the user or individual, using another embodiment of a personal cancelable biometric reference template generation device, in accordance with an embodiment of the present invention.

Reference is now made to FIG. 5, reference numeral 500, which depicts a flowchart outlining the steps for generating a cancelable or revocable or derivative biometric reference template on demand to a user or individual, in response to a request from the user or individual, using another embodiment of a personal cancelable biometric reference template generation device, in accordance with an embodiment of the present invention. The process begins with a biometric service provider providing in step 502 a security token device that is to be distributed to an individual or user (device holder) for generating a cancelable biometric reference template to an entity, as needed. A cancelable biometric reference template transformation engine is loaded onto the token device in step 504. The biometric service provider obtains or accesses in step 506 a base biometric reference template of the individual to whom the token device is to be issued. The biometric service provider signs the base biometric reference template in step 508 and in step 510 the biometric service provider injects the signed base biometric reference template of the individual into the token device. The biometric service provider issues the token device to the individual corresponding to the base biometric reference template for generating a cancelable biometric reference template on demand, ending the process. The process of generating a cancelable biometric reference template is discussed further herein below with respect to FIG. 7.

Figure 6:
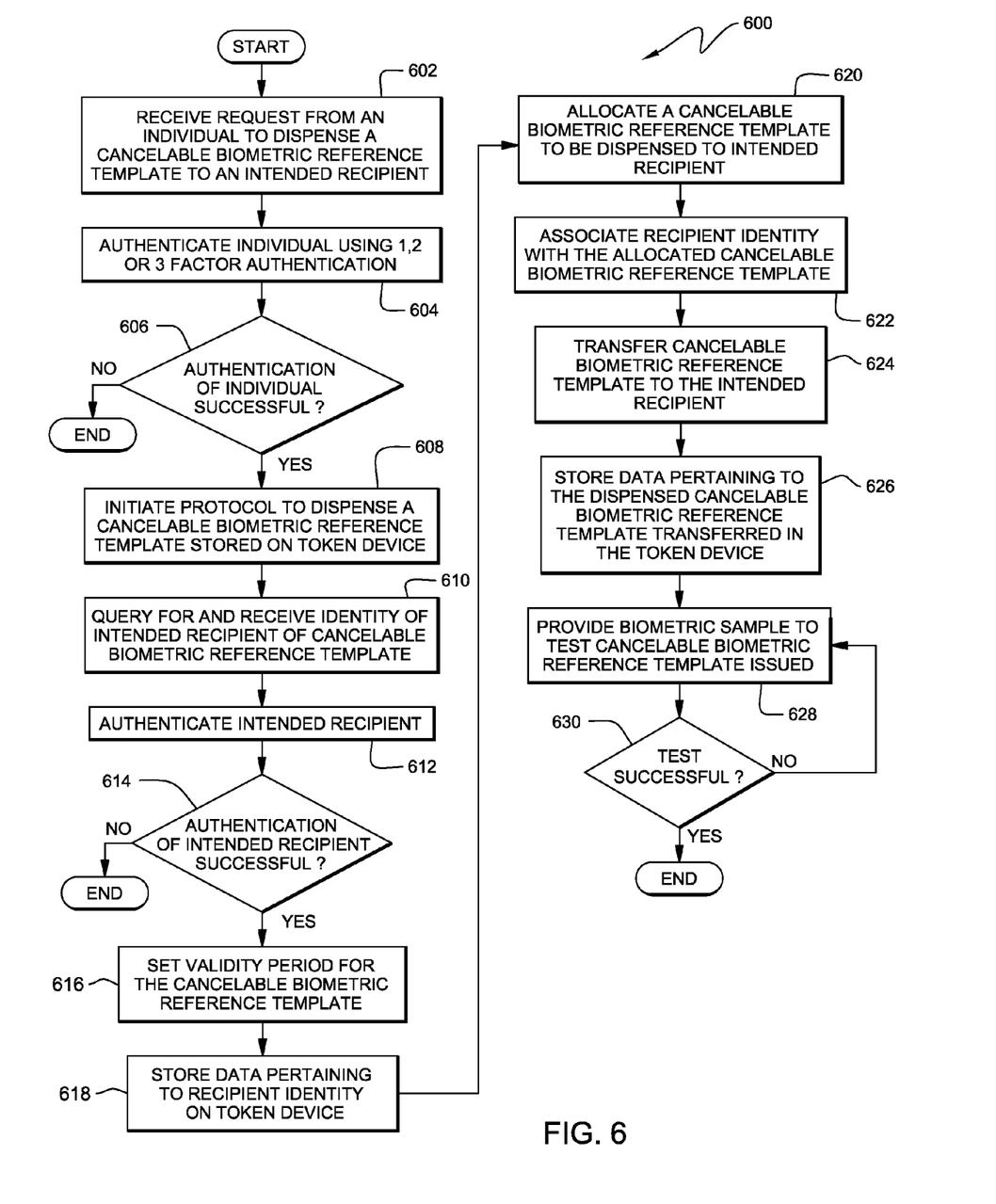
FIG. 6 depicts a flowchart outlining the steps for issuing to an entity a cancelable or revocable or derivative biometric reference template dispensed on demand, in response to a request from a user or individual, using an embodiment of a cancelable biometric reference template generation device shown in FIG. 1, in accordance with an embodiment of the present invention.

Turning to FIG. 6, reference numeral 600, depicts a flowchart outlining the steps for dispensing to an entity or intended recipient a cancelable or revocable or derivative biometric reference template belonging to an individual, which is stored within an embodiment of a cancelable biometric reference template generation device (also, referred to as a "template generation device") shown in FIG. 2, in accordance with an embodiment of the present invention. In an embodiment, the template generation device is a security token device that is issued to the individual. The process begins in step 602 with a biometric application within a computer system receiving a request from an individual or device holder of the security token device to dispense to an intended recipient a cancelable biometric reference template among the one or more cancelable biometric reference templates stored onto the security token device. For example, the individual may want to access an account at a bank and, thus, wants to issue a cancelable biometric reference template to the bank. In step 604, the individual or device holder is authenticated. In an embodiment, the token device is configured to use either a one, two or three factor authentication process for authenticating the individual. In particular, in a one-factor authentication, the individual may have to provide a password or a pin for authentication purposes, whereas, in a two-factor authentication, the individual may have to prove possession of the security token device along with the password or a pin for authentication purposes. Further, in a three-factor authentication, the individual may have to prove possession by providing the security token device, a password or a pin along with a biometric sample of the individual for authentication purposes. In step 606, a determination is made as to whether or not the authentication of the individual was successful. If the authentication is not successful, that is, the authentication fails, then the process ends. However, if the authentication is successful, then the token device initiates in step 608 a protocol to dispense a cancelable biometric reference template that is stored onto the token device. In step 610, the biometric application queries for and receives the identity of the intended recipient to whom the cancelable biometric reference template is to be issued. Further, in step 612, the intended recipient is authenticated. A determination is made in step 614 as to whether or not the authentication of the intended recipient was successful. If it is determined that the authentication of the intended recipient is not successful, then the process ends. However, if it is determined that the authentication of the intended recipient is successful, then the individual is prompted in step 616 to set a validity period or expiration date for the cancelable biometric reference template. Further, the biometric application stores data pertaining to an identifier of the cancelable biometric reference template being dispensed and pertaining to the recipient identity (identity of the intended recipient to whom the cancelable biometric reference template is to be issued) onto the token device in step 618. The biometric application allocates in step 620 a cancelable biometric reference template to be dispensed to the intended recipient and associates the recipient identity with the allocated cancelable biometric reference template in step 622. The biometric application dispenses by transferring in step 624 the cancelable biometric reference template allocated to the intended recipient. Further, the biometric application stores data pertaining to the dispensed cancelable biometric reference template transferred to the intended recipient onto the token device in step 626. Further, in an embodiment, the individual provides a biometric sample to test against the dispensed template, in step 628, the cancelable biometric reference template issued. A determination is made in step 630 as to whether or not the test was successful. If the test is determined not to be successful, then the individual is asked to provide another biometric sample to test the cancelable biometric reference template. However, if the test is determined to be successful in step 630, the process ends.

Figure 7:
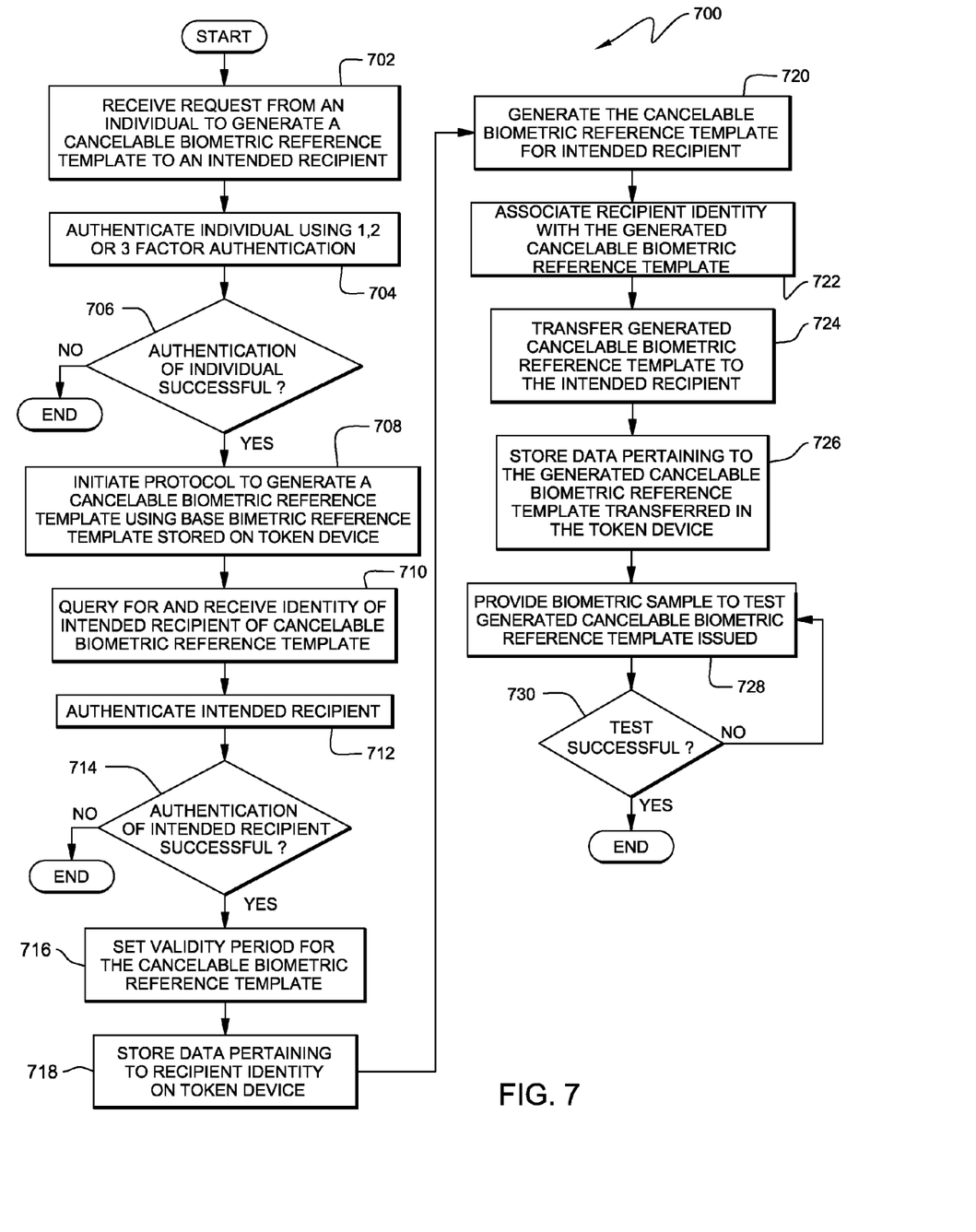
FIG. 7 depicts a flowchart outlining the steps for issuing to an entity a cancelable or revocable or derivative biometric reference template generated on demand, in response to a request from a user or individual, using another embodiment of a cancelable biometric reference template generation device shown in FIG. 2, in accordance with an embodiment of the present invention.

Turning to FIG. 7, reference numeral 700, depicts a flowchart outlining the steps for generating a cancelable or revocable or derivative biometric reference template for issuing to an entity or intended recipient, in response to a request from a user or individual, using an embodiment of a cancelable biometric reference template generation device shown in FIG. 2, in accordance with an embodiment of the present invention. In an embodiment, the template generation device is a security token device that is issued to the individual. The process begins in step 702 with a biometric application within a computer system receiving a request from an individual or device holder of the security token device to generate and dispense a cancelable biometric reference template for issuing to an intended recipient, using a transformation engine loaded onto the security token device, which transforms the base biometric reference template belonging to an individual into a cancelable biometric template. In step 704, the individual or device holder is authenticated. In an embodiment, the token device is configured to use either a one, two or three factor authentication process for authenticating the individual. In particular, in a one-factor authentication, the individual may have to provide a password or a pin for authentication purposes, whereas, in a two-factor authentication, the individual may have to prove possession of the security token device along with the password or a pin for authentication purposes. Further, in a three-factor authentication, the individual may have to provide the security token device, a password or a pin along with a biometric sample of the individual for authentication purposes. In step 706, a determination is made as to whether or not the authentication of the individual was successful. If the authentication is not successful, that is, the authentication fails, then the process ends. However, if the authentication is successful, then the token device initiates in step 708 a protocol to generate a cancelable biometric reference template using the transformation engine loaded onto the token device, as explained herein above. In step 710, the biometric application queries for and receives identity of the intended recipient to whom the cancelable biometric reference template is to be issued. Further, in step 712, the intended recipient is authenticated. A determination is made in step 714 as to whether or not the authentication of the intended recipient was successful. If it is determined that the authentication of the intended recipient is not successful, then the process ends. However, if it is determined that the authentication of the intended recipient is successful, then the individual is prompted in step 716 to set a validity period or expiration date for the cancelable biometric reference template. Further, the biometric application stores data pertaining to an identifier of the cancelable biometric reference template being dispensed and pertaining to the recipient identity (identity of the intended recipient to whom the cancelable biometric reference template is to be issued) onto the token device in step 718. The biometric application generates in step 720 a cancelable biometric reference template to be dispensed to the intended recipient and associates the recipient identity with the generated cancelable biometric reference template in step 722. The biometric application transfers in step 724 the generated cancelable biometric reference template allocated to the intended recipient. Further, the biometric application stores data pertaining to the generated cancelable biometric reference template transferred to the intended recipient onto the token device in step 726. Further, in an embodiment, the individual provides a biometric sample to test, in step 728, the cancelable biometric reference template issued. A determination is made in step 730 as to whether or not the test was successful. If the test is determined not to be successful, then the individual is asked to provide another biometric sample to test the cancelable biometric reference template. However, if the test is determined to be successful in step 730, the process ends.

Accordingly, the invention provides a system, method and a program product for generating a cancelable or revocable biometric reference template on demand, in response to a request from a user or individual, using an embodiment of a cancelable biometric reference template generation device, as described herein above. The invention provides the ability to generate and dispense, as needed, one or more cancelable or revocable biometric reference templates that are created from a base biometric reference template, using a mathematical transformation applied to the base biometric reference template. As such, when an individual wishes to allow a merchant or other entity to use their personal biometric information for allowing access to some resource (such as, a facility or an account), the individual is able to provide a unique reference template to each entity and is not required to share a single instance of their base reference template. The individual is able to provide a new unique cancelable reference template without having to enroll in another computer system or contact a biometric service provider to request a new template containing cancelable biometric data. Thus, the invention eliminates the inconvenience to an individual of having to enroll in a computer system each time they wish to make use of their biometric information with a new merchant or other entity, or the inconvenience of having to contact a biometric service provider to obtain another derivative of their base reference template. Further, the invention eliminates the need to reveal unique personal information in the form of a biometric reference template that can be used to monitor and track the individual after their participation in an authentication event.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating on demand a cancelable biometric reference template, said method comprising:

a processor of a computer system creating, using a biometric application, a base biometric reference template comprising base biometric data corresponding to a biometric sample collected for an individual and a unique biometric template identifier that uniquely identifies said base biometric data and said computer system comprising the biometric application, a cancelable biometric transformation engine, and an authentication tool for signing the base biometric reference template;

said processor generating, utilizing the cancelable biometric transformation engine, N cancelable biometric reference templates derived from said base biometric reference template, wherein N is at least 1, wherein said N cancelable biometric reference templates generated is configured to be used by said individual to participate in a new biometric application without having to provide a new biometric sample and without having to rely on a biometric service provider to issue a new biometric reference template for said new biometric application;

said processor injecting said base biometric reference template created into a secure portable device issued to said individual, said secure portable device being external to the computer system;

said processor storing said N cancelable biometric reference templates in the portable device; and said processor loading an instance of said cancelable biometric transformation engine onto said secure portable device for generating on demand of said individual said at least one cancelable biometric reference template derived from said base biometric reference template for said new biometric application, wherein the portable device concurrently stores said base biometric reference template, said N biometric reference templates, and said instance of said cancelable biometric transformation engine.

2. The method of claim 1, wherein the base biometric reference template consists of the unique biometric template identifier, the base biometric data, and a biometric type indicator that indicates a type of the base biometric data used to create the base biometric reference template.

3. The method of claim 1, wherein N is at least 2.

4. The method of claim 3, wherein said cancelable biometric transformation engine comprises a data transformation function that includes N sets of transformation keys, and wherein each different set of transformation keys comprises a plurality of keys used to transform said base biometric reference template into a respective different cancelable biometric reference template of said N cancelable biometric reference templates.

5. The method of claim 4, said method further comprising:
said processor assigning a unique transform function identifier for identifying said data transformation function;
said processor generating a list comprising said unique transform function identifier and each set of transformation keys of the N sets of transformation keys;
said processor tracking said list to ensure that a same set of transformation keys of the N sets of transformation keys is not used twice.

6. The method of claim 1, said method further comprising:
said processor assigning a unique cancelable biometric reference template identifier for each cancelable biometric reference template for identifying said each cancelable biometric reference template,
wherein each cancelable biometric reference template comprises its respective cancelable biometric reference template identifier to enable said each cancelable biometric reference template to be associated with said base biometric reference template.

7. A process for deploying computing infrastructure comprising integrating computer-readable code into a computer system, wherein said code in combination with said computer system is capable of performing a method for generating on demand a cancelable biometric reference template, said method comprising:
a processor of the computer system creating, using a biometric application, a base biometric reference template comprising base biometric data corresponding to a biometric sample collected for an individual and a unique biometric template identifier that uniquely identifies said base biometric data, and said computer system comprising the biometric application, a cancelable biometric transformation engine, and an authentication tool for signing the base biometric reference template;
said processor generating, utilizing the cancelable biometric transformation engine, N cancelable biometric reference templates derived from said base biometric reference template, wherein N is at least 1, wherein said N cancelable biometric reference templates generated is configured to be used by said individual to participate in a new biometric application without having to provide a new biometric sample and without having to rely on a biometric service provider to issue a new biometric reference template for said new biometric application;
said processor injecting said base biometric reference template created into a secure portable device issued to said individual, said secure portable device being external to the computer system;
said processor storing said N cancelable biometric reference templates in the portable device; and
said processor loading an instance of said cancelable biometric transformation engine onto said secure portable device for generating on demand of said individual said at least one cancelable biometric reference template derived from said base biometric reference template for said new biometric application,
wherein the portable device concurrently stores said base biometric reference template, said N biometric reference templates, and said instance of said cancelable biometric transformation engine.

8. The process of claim 7, wherein the base biometric reference template consists of the unique biometric template identifier, the base biometric data, and a biometric type indicator that indicates a type of the base biometric data used to create the base biometric reference template.

9. The process of claim 7, wherein N is at least 2.

10. The process of claim 9, wherein said cancelable biometric transformation engine comprises a data transformation function that includes N sets of transformation keys, and wherein each different set of transformation keys comprises a plurality of keys used to transform said base biometric reference template into a respective different cancelable biometric reference template of said N cancelable biometric reference templates.

11. The process of claim 10, said method further comprising:
said processor assigning a unique transform function identifier for identifying said data transformation function;
said processor generating a list comprising said unique transform function identifier and each set of transformation keys of the N sets of transformation keys;
said processor tracking said list to ensure that a same set of transformation keys of the N sets of transformation keys is not used twice.

12. The process of claim 7, said method further comprising:
said processor assigning a unique cancelable biometric reference template identifier for each cancelable biometric reference template for identifying said each cancelable biometric reference template,
wherein each cancelable biometric reference template comprises its respective cancelable biometric reference template identifier to enable said each cancelable biometric reference template to be associated with said base biometric reference template.

13. A computer system comprising a processor, a memory, and a computer readable storage device, said storage device containing program code configured to be executed by the processor via the memory to implement a method for generating on demand a cancelable biometric reference template, said method comprising:
said processor creating, using a biometric application, a base biometric reference template comprising base biometric data corresponding to a biometric sample collected for an individual and a unique biometric template identifier that uniquely identifies said base biometric data, and said computer system comprising the biometric application, a cancelable biometric transformation engine, and an authentication tool for signing the base biometric reference template;
said processor generating, utilizing the cancelable biometric transformation engine, N cancelable biometric reference templates derived from said base biometric reference template, wherein N is at least 1, wherein said N cancelable biometric reference templates generated is configured to be used by said individual to participate in a new biometric application without having to provide a new biometric sample and without having to rely on a biometric service provider to issue a new biometric reference template for said new biometric application;

said processor injecting said base biometric reference template created into a secure portable device issued to said individual, said secure portable device being external to the computer system;

said processor storing said N cancelable biometric reference templates in the portable device; and said processor loading an instance of said cancelable biometric transformation engine onto said secure portable device for generating on demand of said individual said at least one cancelable biometric reference template derived from said base biometric reference template for said new biometric application, wherein the portable device concurrently stores said base biometric reference template, said N biometric reference templates, and said instance of said cancelable biometric transformation engine.

14. The computer system of claim 13, wherein the base biometric reference template consists of the unique biometric template identifier, the base biometric data, and a biometric type indicator that indicates a type of the base biometric data used to create the base biometric reference template.

15. The computer system of claim 13, wherein N is at least 2.

16. The computer system of claim 15, wherein said cancelable biometric transformation engine comprises a data transformation function that includes N sets of transformation keys, and wherein each different set of transformation keys comprises a plurality of keys used to transform said base biometric reference template into a respective different cancelable biometric reference template of said N cancelable biometric reference templates.

17. The computer system of claim 16, said method further comprising:
said processor assigning a unique transform function identifier for identifying said data transformation function;
said processor generating a list comprising said unique transform function identifier and each set of transformation keys of the N sets of transformation keys;
said processor tracking said list to ensure that a same set of transformation keys of the N sets of transformation keys is not used twice.

18. The computer system of claim 13, said method further comprising:
said processor assigning a unique cancelable biometric reference template identifier for each cancelable biometric reference template for identifying said each cancelable biometric reference template,
wherein each cancelable biometric reference template comprises its respective cancelable biometric reference template identifier to enable said each cancelable biometric reference template to be associated with said base biometric reference template.

19. A computer program product, comprising a computer readable physically tangible storage device having a computer readable program code stored therein, said program code configured to be executed by a processor of a computer system to implement a method for generating on demand a cancelable biometric reference template, said method comprising:
said processor creating, using a biometric application, a base biometric reference template comprising base biometric data corresponding to a biometric sample collected for an individual and a unique biometric template identifier that uniquely identifies said base biometric data, and said computer system comprising the biometric application, a cancelable biometric transformation engine, and an authentication tool for signing the base biometric reference template;

said processor generating, utilizing the cancelable biometric transformation engine, N cancelable biometric reference templates derived from said base biometric reference template, wherein N is at least 1, wherein said N cancelable biometric reference templates generated is configured to be used by said individual to participate in a new biometric application without having to provide a new biometric sample and without having to rely on a biometric service provider to issue a new biometric reference template for said new biometric application;

said processor injecting said base biometric reference template created into a secure portable device issued to said individual, said secure portable device being external to the computer system;

said processor storing said N cancelable biometric reference templates in the portable device; and said processor loading an instance of said cancelable biometric transformation engine onto said secure portable device for generating on demand of said individual said at least one cancelable biometric reference template derived from said base biometric reference template for said new biometric application, wherein the portable device concurrently stores said base biometric reference template, said N biometric reference templates, and said instance of said cancelable biometric transformation engine.

20. The computer program product of claim 19, wherein the base biometric reference template consists of the unique biometric template identifier, the base biometric data, and a biometric type indicator that indicates a type of the base biometric data used to create the base biometric reference template.

21. The computer program product of claim 19, wherein N is at least 2.

22. The computer program product of claim 21, wherein said cancelable biometric transformation engine comprises a data transformation function that includes N sets of transformation keys, and wherein each different set of transformation keys comprises a plurality of keys used to transform said base biometric reference template into a respective different cancelable biometric reference template of said N cancelable biometric reference templates.

23. The computer program product of claim 22, said method further comprising:
said processor assigning a unique transform function identifier for identifying said data transformation function;
said processor generating a list comprising said unique transform function identifier and each set of transformation keys of the N sets of transformation keys;
said processor tracking said list to ensure that a same set of transformation keys of the N sets of transformation keys is not used twice.

24. The computer program product of claim 19, said method further comprising:
said processor assigning a unique cancelable biometric reference template identifier for each cancelable biometric reference template for identifying said each cancelable biometric reference template,
wherein each cancelable biometric reference template comprises its respective cancelable biometric reference template identifier to enable said each cancelable biometric reference template to be associated with said base biometric reference template.

* * * * *